United States Patent
Radosavljevic et al.

(10) Patent No.: US 6,446,380 B1
(45) Date of Patent: Sep. 10, 2002

(54) FISH ON ALERT ROD

(76) Inventors: Dragan Radosavljevic, 207 Duncan Rd., Punta Gorda, FL (US) 33932; Alton L. Welch, 7165 Hawkins Rd., Sarasota, FL (US) 34241

(*) Notice: Subject to any disclaimer, the term of this patent is extended or adjusted under 35 U.S.C. 154(b) by 13 days.

(21) Appl. No.: 09/891,766

(22) Filed: Jun. 27, 2001

Related U.S. Application Data (60) Provisional application No. 60/247,225, filed on Nov. 13, 2000.

(51) Int. Cl.[7] .................. A01K 85/01; A01K 93/00; A01K 97/12
(52) U.S. Cl. ................ 43/17; 43/19.2; 43/25; 43/16; 43/17.1; 43/17.5
(58) Field of Search ................. 43/17, 19.2, 25, 43/16, 17.1, 17.5

(56) References Cited

U.S. PATENT DOCUMENTS

| | | | | |
|---|---|---|---|---|
| 4,250,649 A | * | 2/1981 | Harrington et al. | 43/16 |
| 4,376,349 A | * | 3/1983 | Yarczower | 43/17 |
| 4,766,688 A | * | 8/1988 | Hiles | 43/17 |
| 4,930,243 A | * | 6/1990 | Lowe et al. | 43/17 |
| 4,969,285 A | * | 11/1990 | Ellsworth et al. | 43/17 |
| 5,083,249 A | * | 1/1992 | Chen | 362/191 |
| 5,182,873 A | * | 2/1993 | Aragon, Jr. | 43/17 |
| 5,205,061 A | * | 4/1993 | Echols, Jr. | 43/17.5 |
| 5,228,228 A | * | 7/1993 | Meissner | 43/17 |
| 5,274,943 A | * | 1/1994 | Ratcliffe et al. | 43/17 |
| 5,396,726 A | * | 3/1995 | Zepeda, Sr. | 43/17 |
| 5,555,667 A | * | 9/1996 | Bae et al. | 43/17 |
| 5,570,532 A | * | 11/1996 | Shaffer et al. | 43/17 |
| 5,771,624 A | * | 6/1998 | Vickery et al. | 43/17 |
| 5,782,033 A | * | 7/1998 | Park et al. | 43/4 |
| 5,829,181 A | * | 11/1998 | Fielder et al. | 43/17 |
| 5,996,268 A | * | 12/1999 | Buczkowski et al. | 43/17 |
| 6,122,853 A | * | 9/2000 | Genous-Moore | 43/17.5 |

* cited by examiner

Primary Examiner—Peter M. Poon
Assistant Examiner—Bethany L. Griles
(74) Attorney, Agent, or Firm—Frank A. Lukasik (57) ABSTRACT

A signaling device for alerting fishermen to the presence of fish at the fish hook and includes a signal light and sound switching system fitted to a fishing rod so that a fish pulling on the hook and line activates the light and or the sound. A compact system which can be installed within the body of the fishing rod without cumbersome attachments.

7 Claims, 11 Drawing Sheets

FISH ON ALERT ROD

RELATED INVENTION

This application is a Continuation-in-part of U.S. application Ser. No. 60/247,225, filed Nov. 3, 2000.

BACKGROUND OF THE INVENTION

1. Field of the Invention

The present invention relates to signaling devices for alerting fishermen to the presence of fish at the fish hook and more particularly to a signal light and sound switching system fitted to a fishing rod so that a fish pulling on the hook and line activates the light and or the sound. This a useful device especially at night where the fisherman may be unable to see clearly to the end of the fishing rod or where the rod is resting unattended—possibly out of visual range of the fisherman. The instant invention provides a compact system which can be installed within the body of the fishing rod without cumbersome attachments which could otherwise interfere with the fishing activity.

2. Background

Fishermen fishing at night are presently unable to monitor multiple fishing lines without some tactile connection thereto especially on dark nights or at times when distant lights shine in the fisherman's eyes causing a loss of "night vision". It is often the case when fishing that fish do not vigorously signal their presence sufficient to move the tip of the fishing rod and fish are often lost due to a failure by the fisherman to "set" the hook as they should when a fish first tastes the bait. The present invention provides a simple means whereby the slightest pull on the line by the fish will alert the fisherman in time for the hook to be set and the fish caught thereby. In operation, this invention would make it easier to fish at night or to leave a fishing rod in position unattended because the fish would signal its own presence by activating the signaling means described herein.

In each of its embodiments, the invention provides a means whereby a fish would signal its presence on a line by activating a switching a means to close a circuit and activate visual or audible signaling means.

It is a further object of the invention to provide a dedicated system built within a fishing rod at the time of manufacture to include the features described herein.

It is a further object of the invention to provide a modular unit which can be retro-fitted to fishing rods already extant on the market.

It is a further object of the invention to provide a circuit which is closed and energized by the pull of a fish on the fishing line simultaneously generating signals of different types, flashing lights, multi-colored lights, buzzers, bells and other sounding devices and tactile signals such as vibrators, clickers, and pulsating attachments.

It is a further object of the invention to provide a unit which is sealed and impervious to water immersion while remaining accessible for maintenance, battery replacement and repairs or replacement.

It is a further object of the invention to provide a unit without batteries which is entirely sealed and activated by piezoelectricity and the distortion of piezo crystals by the pulling action of the fish on the fishing line.

SUMMARY OF THE INVENTION

Figure 1:
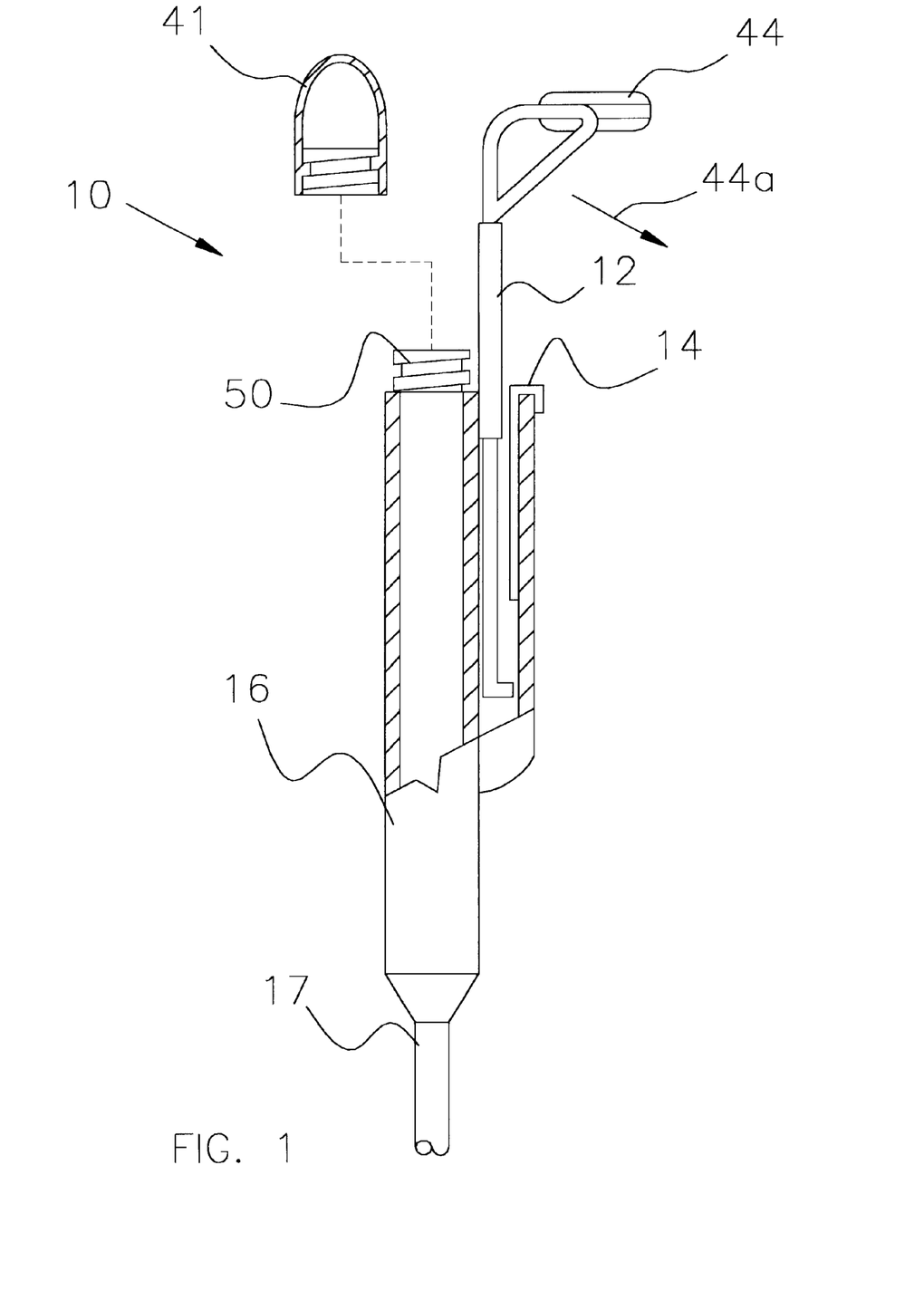
FIG. 1. is an elevational view partially in broken section showing a first embodiment of the invention according to the description herein.
Figure 2:
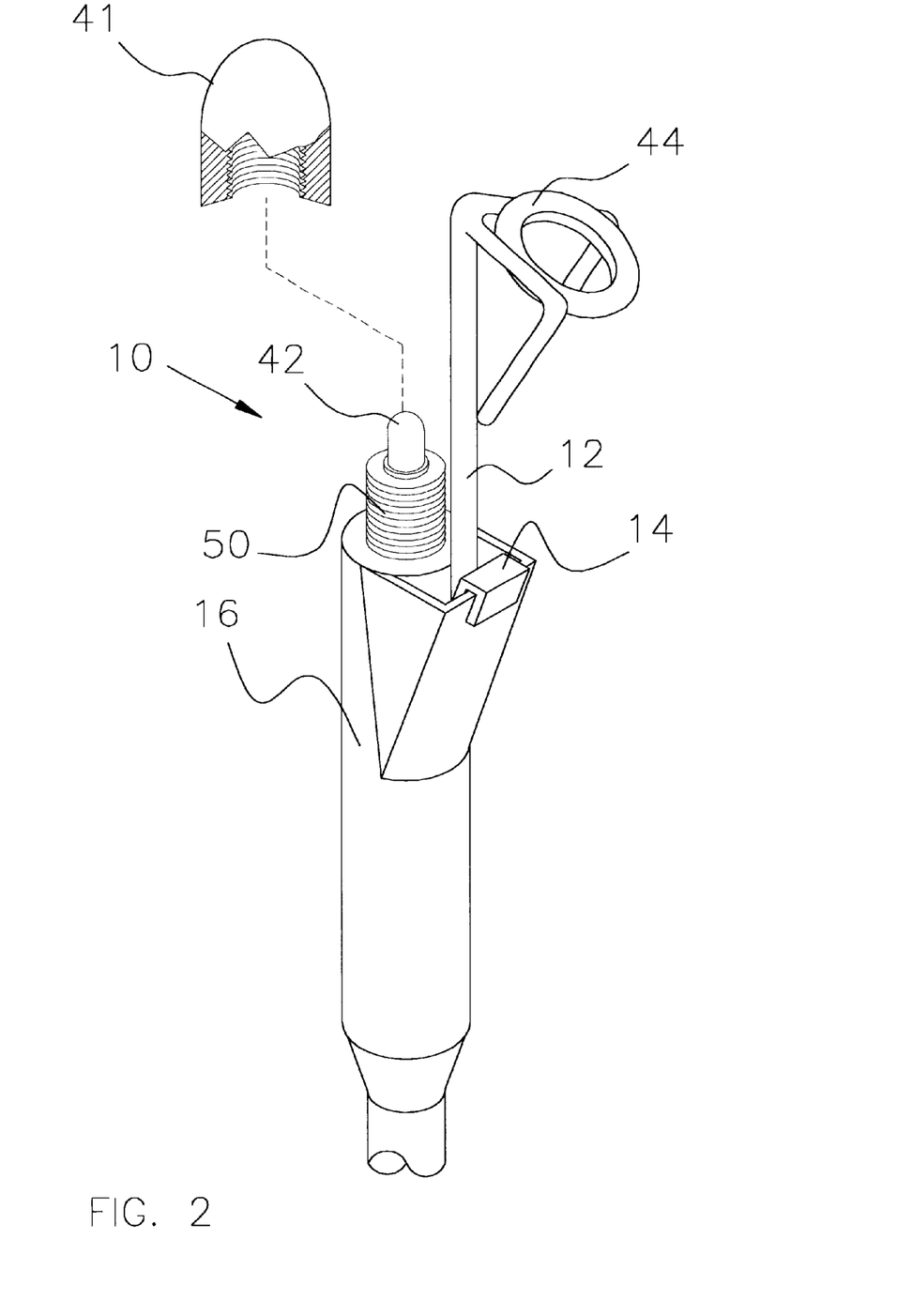
FIG. 2. is an isometric exploded view of the first embodiment of the invention.
Figure 3:
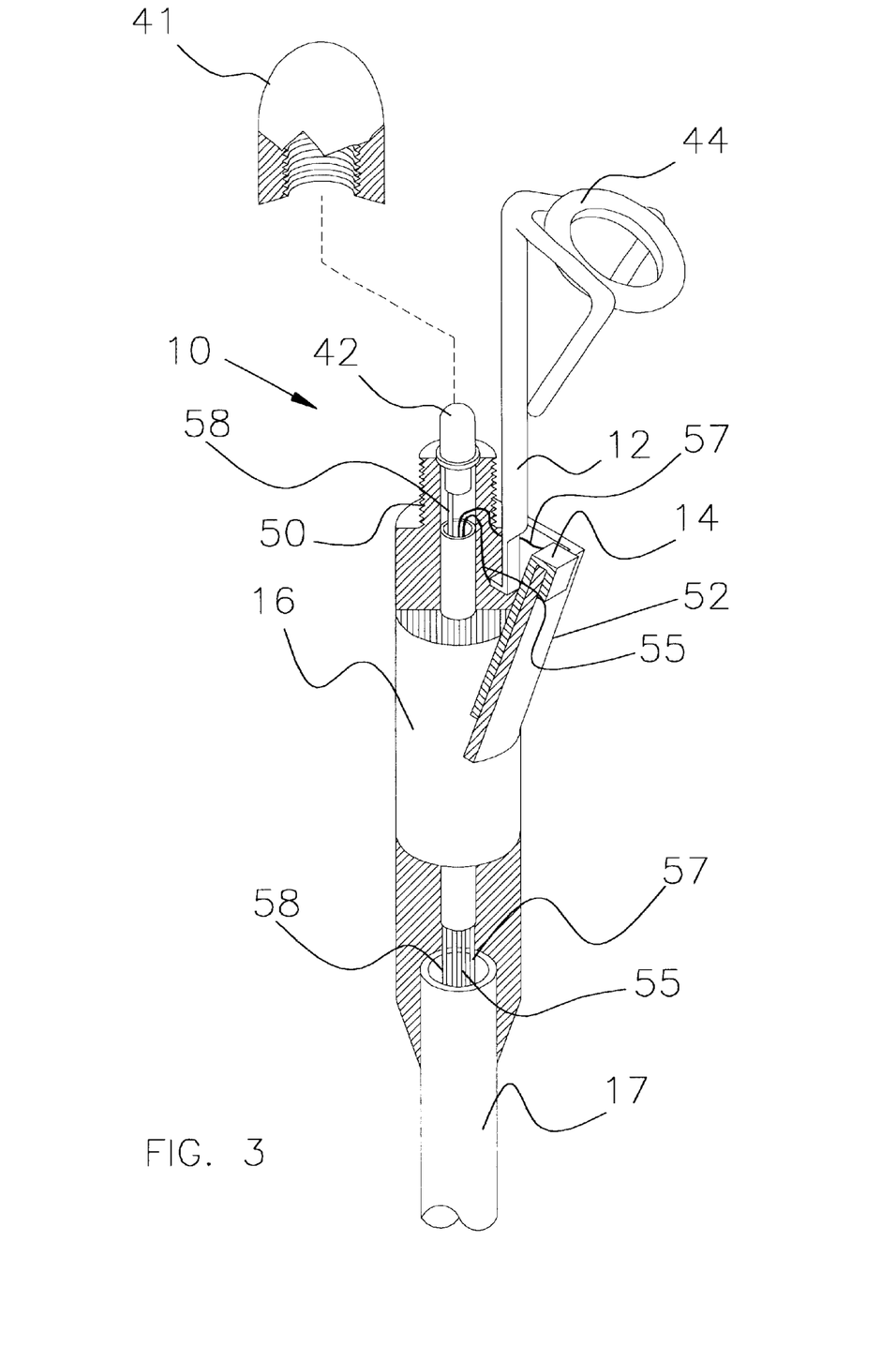
FIG. 3 is an isometric exploded sectional view of the first embodiment of the invention.

Referring now to the attached drawings wherein like numerals designate like and corresponding parts throughout the several views; In FIGS. 1–3 the overall invention in a first embodiment is designated overall by the numeral 10. Plastic body 16 is the hollow tube section into which a fishing rod 17 can be inserted. Screw thread 50 attaches clear cap 41 to the body 16. Line guide 44 is supported by support arm 12 which is pivotally attached to plastic body 16 and can move to make contact with contact point 14. Referring now to FIG. 3, cap 41 is removed revealing L.E.D. 42. Support 12 is connected to green wire 55 on one side of the electrical circuit and contact 14 is connected to yellow wire 57 on the other side of the circuit. Wire 58 is the negative lead for L.E.D 42. Plastic housing 52 supports contact 14 assembly. Fiberglass fishing rod 17 supports the light unit 10.

Figure 4:
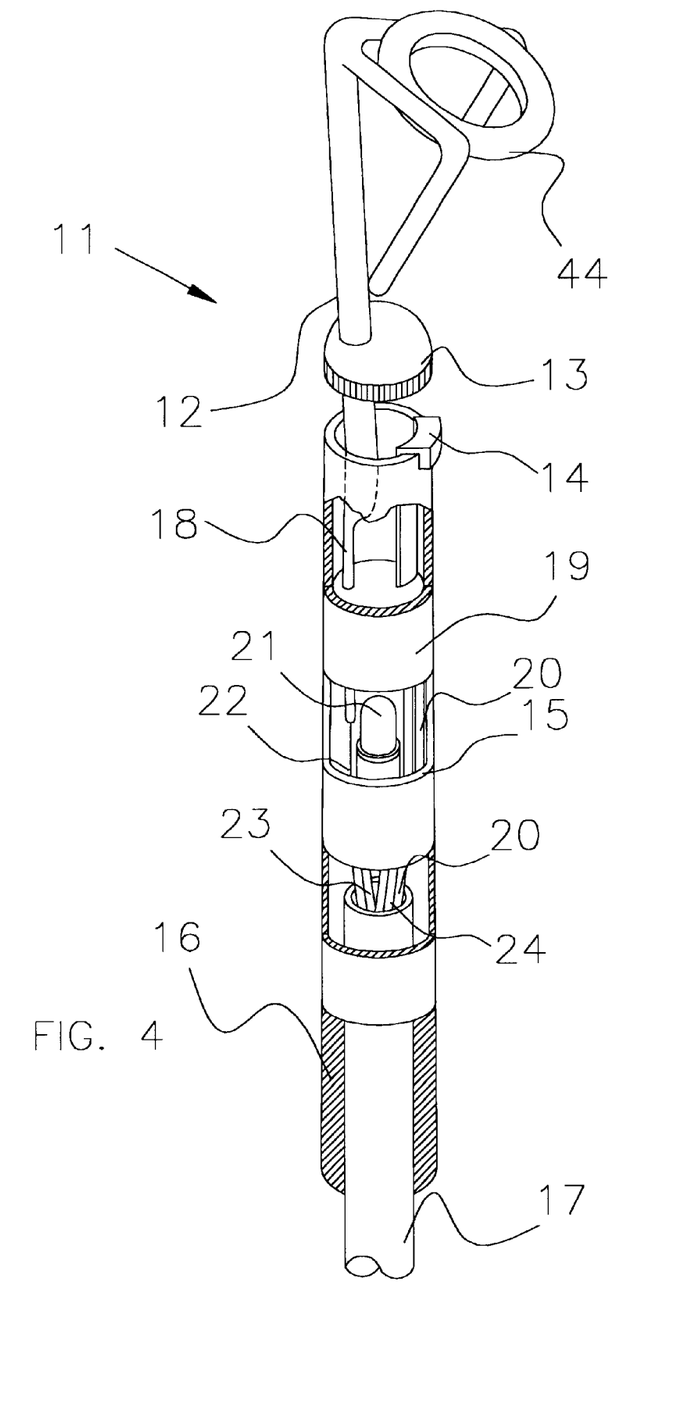
FIG. 4 is an isometric exploded view of a second embodiment of the invention.
Figure 5:
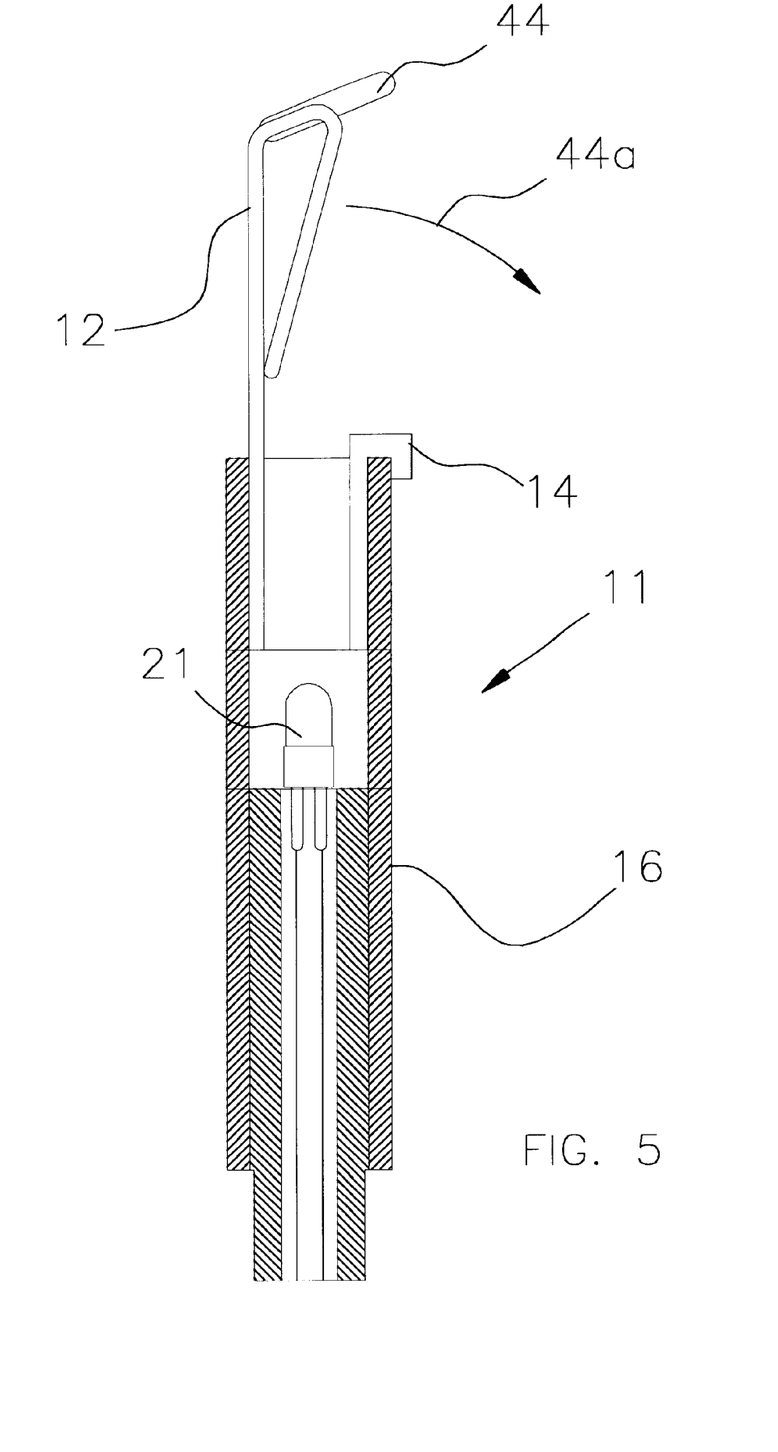
FIG. 5 is an elevational diagrammatic view of the second embodiment of the invention.

In FIG. 4, the second embodiment is shown and designated overall by the numeral 11. In this embodiment, the L.E.D light 21 is located within the center of plastic body 16. Line guide 44 is attached to support 12 which passes through cap 13 and can pivotally connect to contact 14. Wire guide support 12 extends to spring extension 18 which is supported by solid plastic support 19. Clear plastic lens 15 protects bulb 21. Bulb 21 is part of the lighting circuit which comprises, blue wire 20 for contact plate 14, yellow wire 22 connected to spring extension 18, red (positive) wire 23 and green (negative)wire 24. Contact plate 14 is the switching means for the circuit by which movement of support 12 and line guide 44 causes the light circuit to close and activate light 21. In FIG. 5 the relationship is seen between plastic case 16, L.E.D bulb 21, contact plate 14, support 12 and guide 44. Guide 44 is pivots in the direction of arrow 44a.

Figure 6:
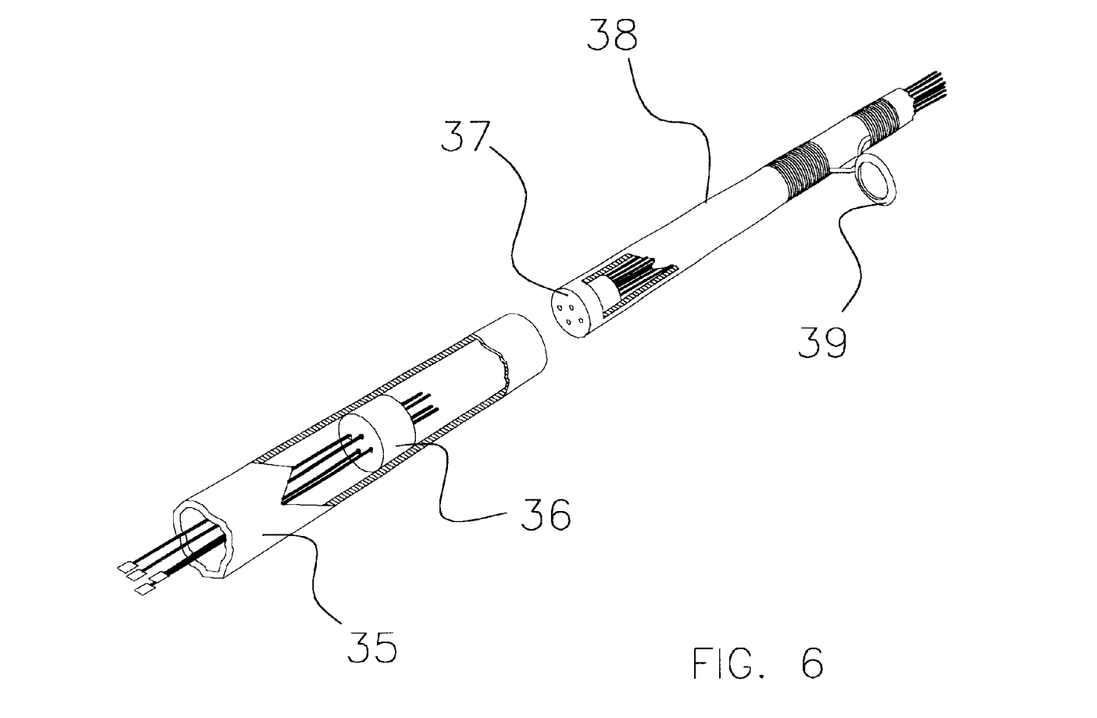
FIG. 6 is an isometric view partially in section showing a fishing rod adapted to house wiring components and connections of the invention.

FIG. 6 is a sectional view of the modified fishing rod comprising; lower end 35, male four prong plug 36, female four prong plug 37, upper section of the rod 38 and line guide 39. In operation, prong plug 36 is inserted into female four prong plug 37 to connect two sections of the fishing pole and the wiring circuit contained therein.

Figure 7:
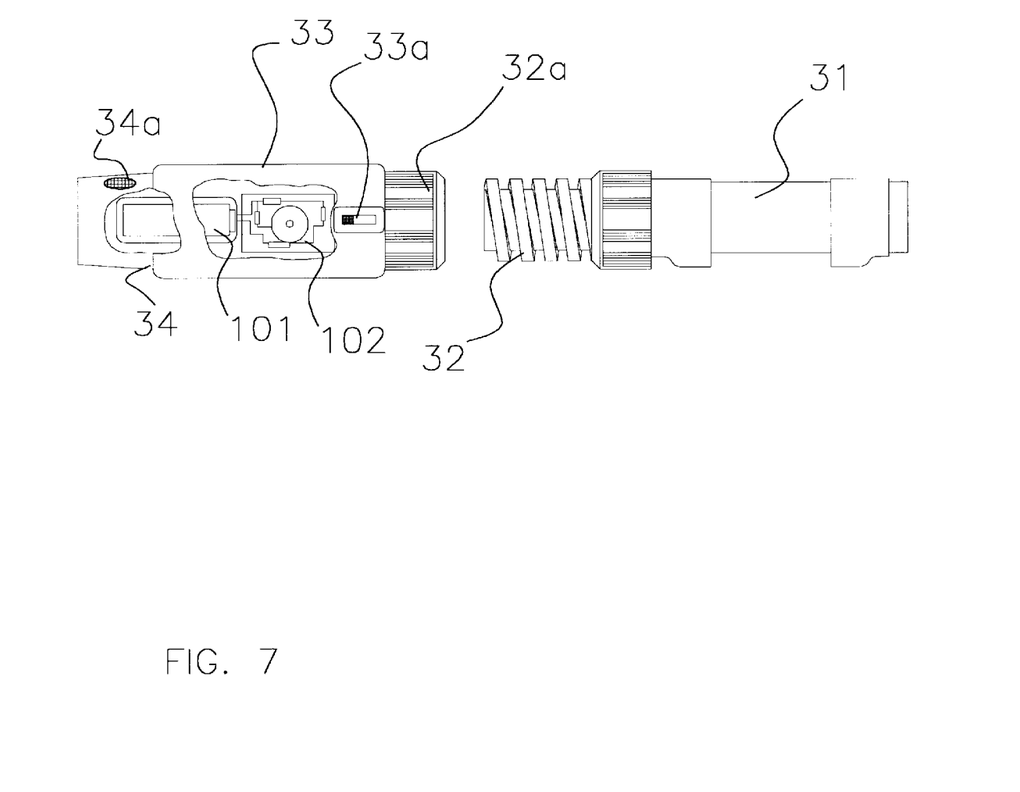
FIG. 7 is an elevational view of the handle portion of a fishing pole adapted to accommodate components of the invention.

FIG. 7 is a view of the lower end of a fishing rod with standard reel attachment 31, unit 32–34 is a hollow housing containing the printed electronic circuit 102, a beeper. battery 101 and an on/off switch 33a. Rubber cap 34 has an aperture 34a for sound from the beeper to exit.

Figure 8:
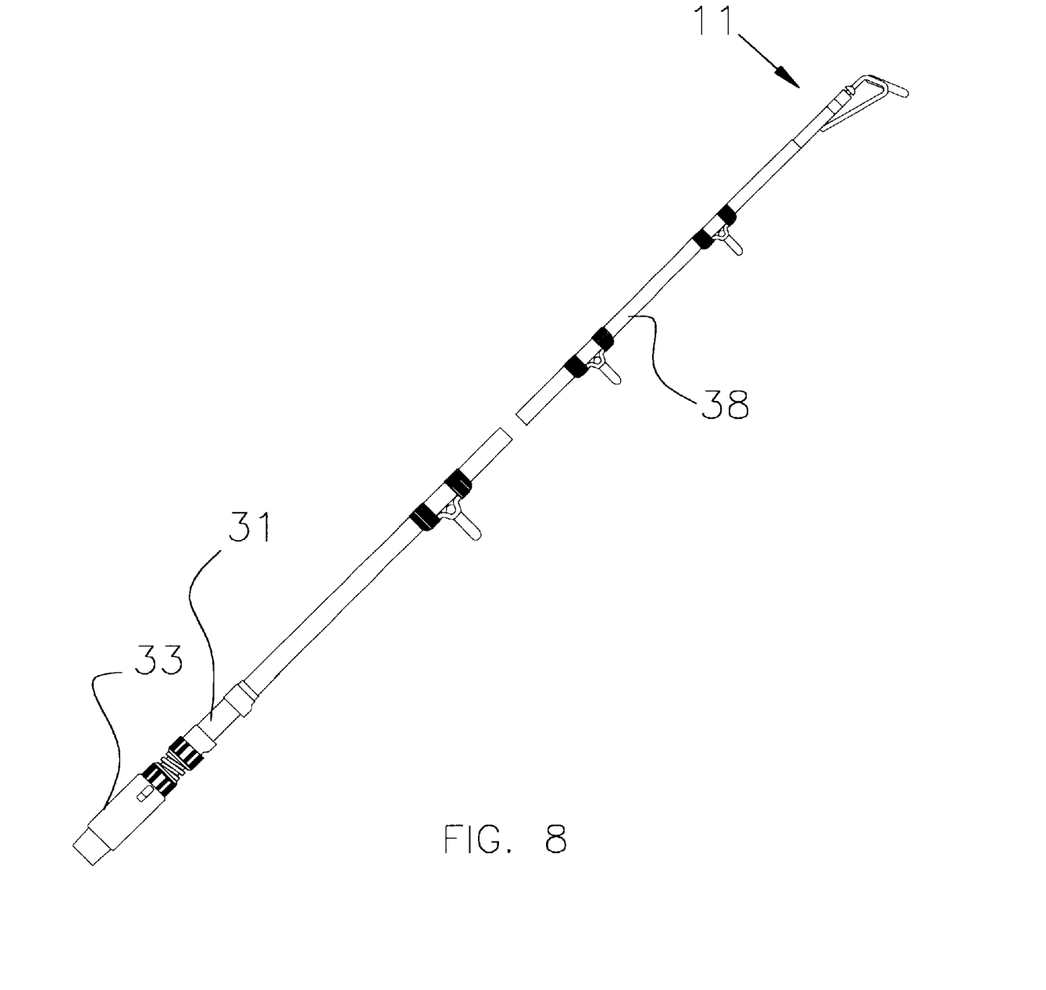
FIG. 8 is an isometric view of a fishing pole fitted with the invention.

FIG. 8 shows a typical rod assembling using second embodiment light unit 11.

Figure 9:
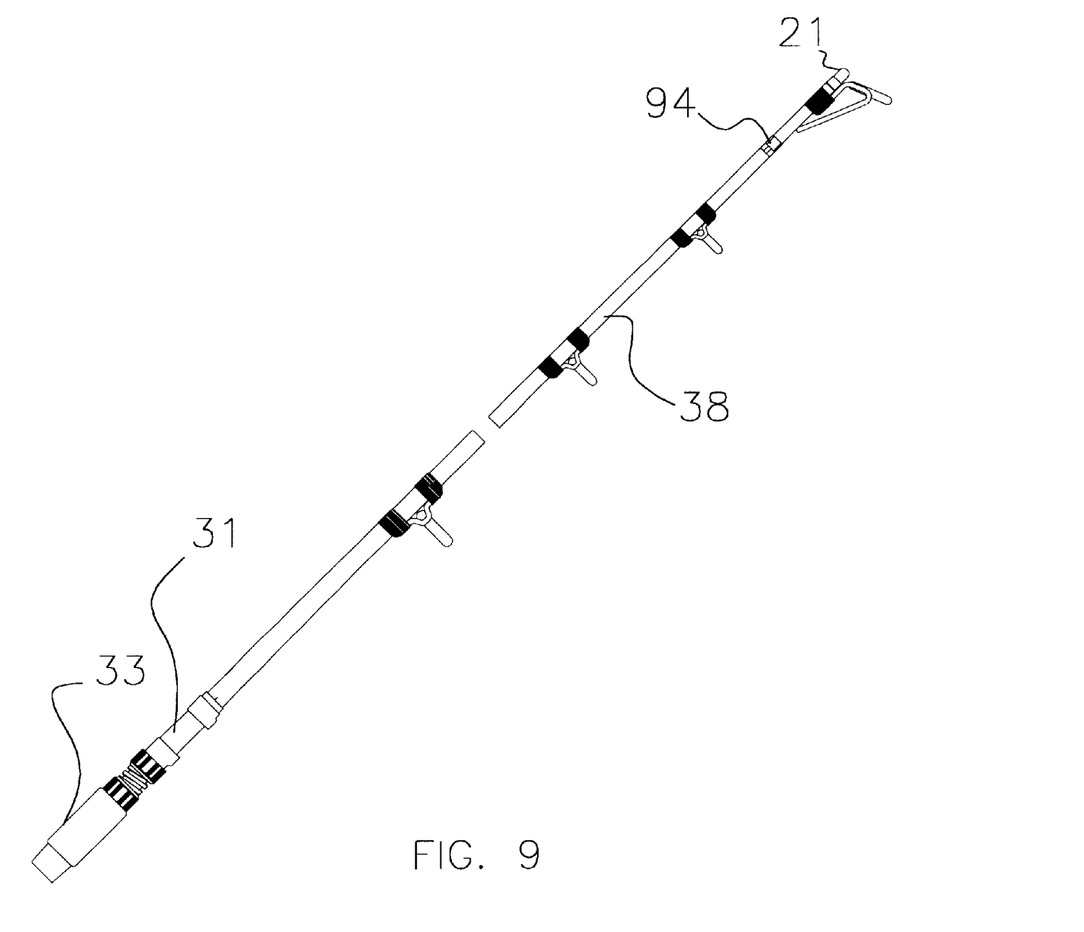
FIG. 9 is an isometric view of a fishing pole fitted with a further embodiment of the invention.
Figure 9A:
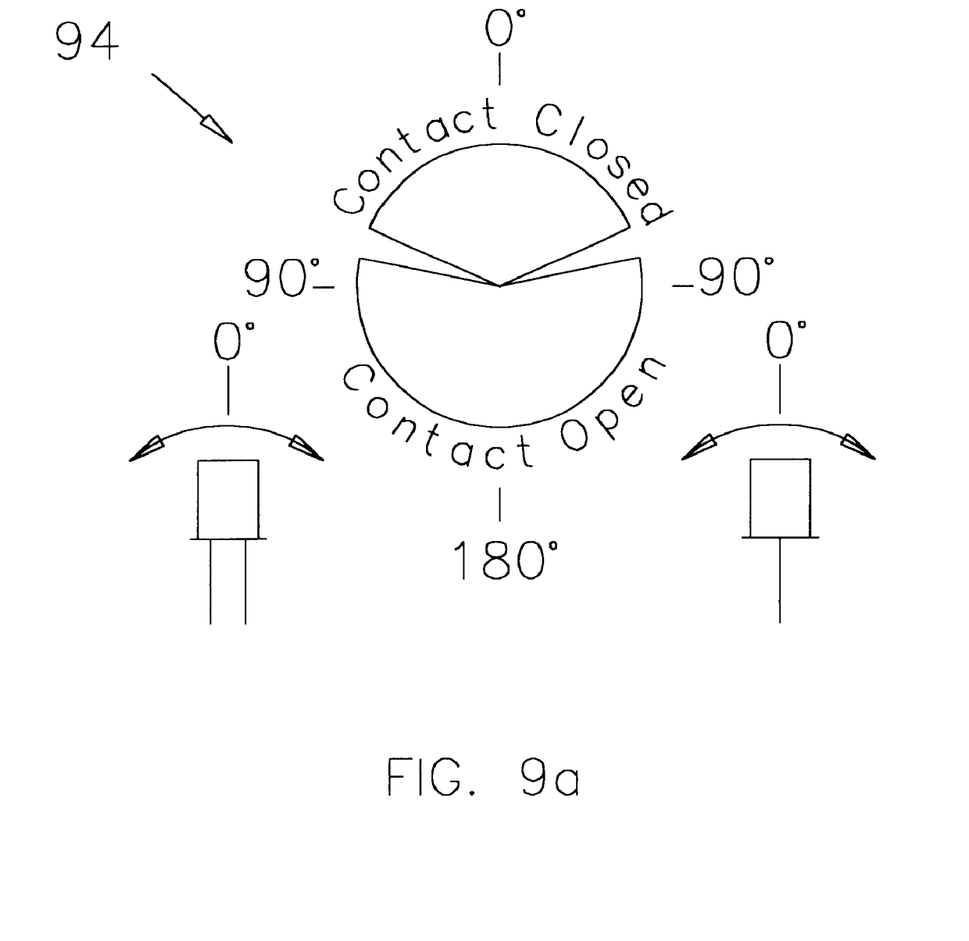
FIG. 9a is a diagrammatic view of a mercury switch which constitutes a part of the embodiment shown in FIG. 9.

FIG. 9 shows a typical rod assembling using a further embodiment of the invention which utilizes mercury switch 94 (FIG. 9*a*) to activate L.E.D. 21.

Figure 10:
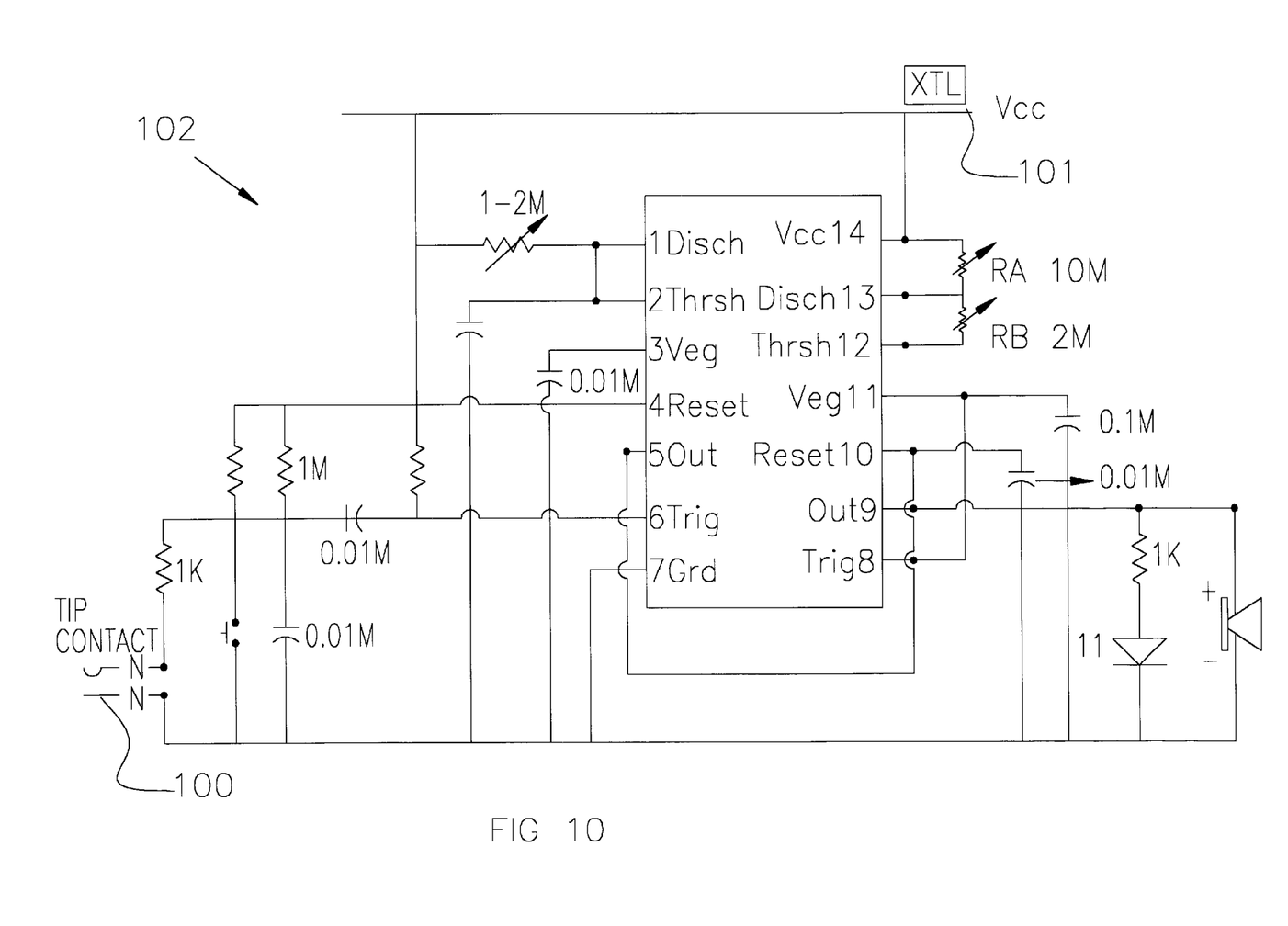
FIG. 10 is a circuit diagram of the invention.

FIG. 10 is the electronic circuit of the device. The circuit is closed and activated either by tip contacts 100 (FIGS. 1–5) or by a mercury switch (FIG. 9) and energized by batteries or piezo crystals 101.

What is claimed is:

1. A fishing pole alert apparatus comprising:
   a fishing pole, said fishing pole having a tip end and a handle end and a plurality of eyelets fastened along the entire length of said pole,
   a hollow plastic body affixed to said fishing pole tip end, said tip end having a line guide mounted thereon, said plastic body having a first proximal end and a second distal end, said proximal end having a cylindrical containment chamber having a light emitting diode mounted therein axially aligned with said fishing pole, said chamber having a first proximal end and a second distal end, said chamber distal end having a plurality of openings,
   switch means mounted within said fishing pole for signaling the presence of a pulling action by a fish,
   a switchable activation means mounted in said handle, said activation means having a printed electronic circuit, a power source, an audible signal means and a plurality of electrical wires, said wires extending through said openings in said distal end of said chamber to said distal end of said hollow fishing pole, and
   a signaling means mounted within said handle first proximal end and said signaling means being electrically connected to said printed electronic circuit by said electrical wires.

2. The fishing pole alert apparatus according to claim 1 wherein the apparatus is encapsulated within a sealing medium, said apparatus being fitted within said fishing pole at time of manufacture of said pole.

3. The fishing pole alert apparatus according to claim 1 wherein the electro motive power is provided by a piezo-electric crystal switching means.

4. The fishing pole alert apparatus according to claim 1 wherein a mercury switch activates said electronic circuit.

5. The fishing pole alert apparatus according to claim 1 wherein said signaling means comprises:
   a vibrational unit, said unit being inserted within said hollow fishing pole.

6. The fishing pole alert apparatus according to claim 1 wherein said signaling means comprises:
   a colored L.E.D.

7. The fishing pole alert apparatus according to claim 1 wherein said signaling means comprises:
   a flashing strobe light.

* * * * *